United States Patent [19]

Dempsey et al.

[11] Patent Number: 5,126,567
[45] Date of Patent: * Jun. 30, 1992

[54] ELECTRET GAMMA/X-RAY LOW LEVEL DOSIMETER

[75] Inventors: John C. Dempsey, Frederick; Lorin R. Stieff, Kensington, both of Md.

[73] Assignee: Rad Elec, Inc., Frederick, Md.

[*] Notice: The portion of the term of this patent subsequent to Apr. 16, 2008 has been disclaimed.

[21] Appl. No.: 670,781

[22] Filed: Mar. 19, 1991

Related U.S. Application Data

[63] Continuation-in-part of Ser. No. 387,497, Jul. 31, 1989, Pat. No. 5,008,540, and Ser. No. 936,240, Dec. 1, 1986, Pat. No. 4,853,536.

[51] Int. Cl.$^5$ ................................................. G01T 1/14
[52] U.S. Cl. ................................. 250/336.1; 250/374
[58] Field of Search .............................. 250/336.1, 374

[56] References Cited

U.S. PATENT DOCUMENTS 2,695,363 11/1954 Marvin ................................. 250/374
5,008,540 4/1991 Dempsey ......................... 250/336.1

Primary Examiner—Carolyn E. Fields
Attorney, Agent, or Firm—Cushman, Darby & Cushman

[57] ABSTRACT

A small enclosed ion chamber with an electrostatically charged electret attached to the inner chamber wall. Filtered holes in the chamber permits radon in the ambient air in the chamber to enter or exit by diffusion. Positive or negative ions (depending on the polarity of the electret charge) formed in the chamber air by the passing of gamma radiation or X-rays move to and collect on the electret surface by virtue of its electrostatic attraction to ions of opposite polarity. These ions neutralize the ions of opposite polarity on the electret and cause a measurable reduction in its surface voltage which reduction is proportional to the dose of gamma and/or X-ray incidence on the chamber. The reduction of the electret surface voltage is used to calculate the dose of gamma or X-ray radiation incident upon the chamber during a known exposure period. In one embodiment, a sealed radioactive-gas-tight flexible-wall container, such as a bag, surrounds the chamber to prevent any ambient radon from entering the ion chamber. In addition, an absorbent such as activated charcoal can be included in the bag to remove any radon captured within the sealed chamber. Removal of this radon removes its undesirable contribution to the gamma/X-ray dose signal and thereby enhances the accuracy of the monitor.

10 Claims, 5 Drawing Sheets

ELECTRET GAMMA/X-RAY LOW LEVEL DOSIMETER

BACKGROUND OF THE INVENTION

This is a continuation-in-part application of Ser. No. 07/387,497 filed July 31, 1989 now U.S. Pat. No. 5,008,540 and Ser. No. 06/936,240, filed Dec. 1, 1986, now U.S. Pat. No. 4,853,536 issued Aug. 1, 1989.

The present invention provides simple, effective and accurate cumulative measurement of gamma radiation. It can provide the value of gamma radiation to be used for calculation of radioactive gas concentrations. It can also provide a tissue equivalent dosage measurement of gamma radiation.

H. B. Marvin (U.S. Pat. No. 2,695,363; Method and Apparatus for Measuring Ionizing Radiations, issued Nov. 23, 1954) used an electret to collect and store ions. The chamber in this earlier invention was sealed to prevent air entry so that, in theory, it measured only the gamma radiation which penetrated through the chamber wall.

Marvin, however, did not account for effects of radon gas which might diffuse inside chambers and interfere with the signal from the penetrating radiation. There is no way to distinguish between the ions generated by the penetrating radiation from outside the electret ion chamber (EIC) and those generated by a radioactive gas inside. Thus, in order to use an EIC to measure low levels of penetrating radiation accurately it is necessary that the EIC chamber be completely devoid of any radon during the measurement.

It is very difficult to exclude radon from a chamber because radon gas is ubiquitous in nature. Radon readily diffuses through most ordinary seals such as gaskets and O-rings which can be used to seal the opening in the EIC through which the electret must be inserted and removed. A permanent seal around the opening (e.g., one made by soldering or welding) is not suitable because the seal must be broken every time the electret is removed for voltage measurement and replaced in the EIC to effect a radiation measurement.

SUMMARY OF THE INVENTION

The present invention measures gamma or X-rays by employing an electret ion chamber (EIC) enclosed in a radioactive gas-tight flexible-wall container, such as a bag. The bag keeps radon out of the EIC, reducing radon interference with gamma and X-ray measurements. The bag allows gamma and X-rays to penetrate, however, gamma rays or X-rays which penetrate the EIC ionize the air in the chamber. The ions move to the electret surface and reduce its voltage. The voltage reduction is a measure of the gamma or X-ray concentration at the test site.

A sorbent material, such as activated charcoal, may be enclosed in the flexible-walled container with an EIC. The charcoal absorbs radon which has diffused out of the EIC and which is present in the ambient surrounding the EIC.

The radioactive gas-tight bag may be made of MYLAR or metal foil. Furthermore, the bag and the EIC may be made of low-Z (low atomic weight) material which simulates the Z value of human tissue. This design allows for a tissue-equivalent measurement of gamma/X-ray absorption. The low-Z material also allows measurement of very low energy gamma photons as well as very high energy ones.

DETAILED DESCRIPTION OF THE PREFERRED EMBODIMENT

Electret ion chambers (EICS) are excellent instruments for measuring penetrating radiation, i.e., gamma rays and x-rays. When penetrating radiation passes through an EIC, it ionizes the air in the EIC chamber and ions thus formed move to the electret surface and reduce the voltage on the electret. The amount of voltage reduction on the electret during a known exposure period, as determined by measuring the change in the surface voltage of the electret, is a measure of the amount of radiation which penetrated the chamber.

The invention comprises a simple and inexpensive method of preventing radon interference in an EIC measurement of penetrating radiation. It does this in one embodiment by placing filtered holes in the EIC wall, by enclosing the EIC in a sealable outer container, and by including a sorbent such as activated charcoal, in the space between the EIC and the outer container. The activated charcoal in the space between the EIC and outer container serves to absorb all of the radon out of the air which was trapped inside the outer container during assembly, including that which was trapped inside the EIC itself. The activated charcoal does this by a well known absorption process called gettering. The radon trapped in the EIC itself is gettered out by the activated charcoal through the filtered holes provided in the EIC wall. The activated charcoal also getters any additional radon which may diffuse into the outer container after it is sealed.

Figure 1:
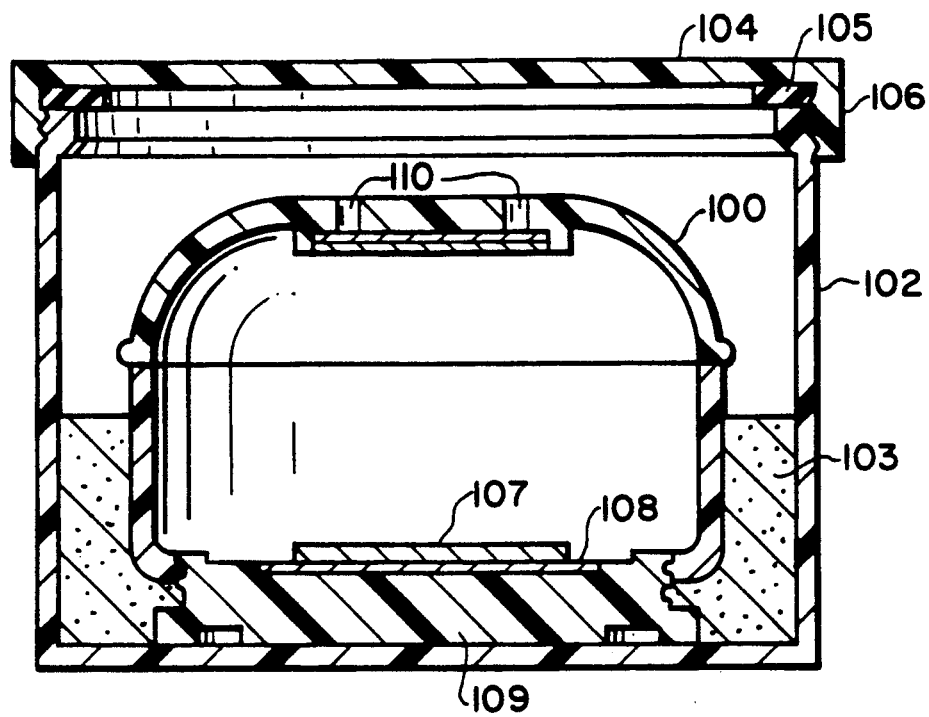
FIG. 1 is a cross-sectional view of a first embodiment of the present gamma monitor.

FIG. 1 shows a sectional view of a first embodiment. An EIC 100 is contained inside a sealable outer container 102 and all or part of the space between the EIC and the outer container is filled with a radon sorbent 103 such as activated charcoal or a radon free liquid such as water. If a liquid seal is used, the EIC must be sealed to exclude the liquid, e.g., placed in a ZIPLOC sealable plastic bag. The outer container 102 has a lid 104 which is closed tightly to effect a seal by compressing a compression gasket 105 or other sealing means between the lid 104 and the upper rim of the container 106. The sorbent 103 in the space between the EIC 100 and the sealed outer container 102 can be either in open granular form or packaged in a suitable permeable bag, box or canister for more convenient handling.

The EIC 100 in this embodiment contains an electret 107 mounted in a threaded electret assembly 108 which can be screwed in and out of a receptacle 109 in the EIC. The holes 110 in the EIC and the filter 111 which covers the holes provide a pathway through which the radon is gettered out of the EIC by the sorbent 103 after lid 104 is sealed on the outer container 102. The filter 111 prevents particles from entering the EIC.

The components of the invention can be made out of most metals or plastics, but the EIC material itself, or at least its surface, must be electrically conductive. However, if all of the components are made of low-Z (i.e., low atomic weight) plastic, the invention has an important additional application in that it can then measure the very low energy gamma photons as well as the high energy photons which penetrate its chamber. When all of these low energy gamma photons are included in a gamma measurement, the result is known as an air equivalent gamma measurement. Moreover, if the materials which comprise the walls of the EIC chamber have the same Z value as human tissue, a gamma or x-ray measurement made with such an instrument will yield a tissue equivalent dose measurement. This is important because such tissue equivalent dose measurements give the actual radiation dose which humans and other animals would receive under the same exposure conditions.

This embodiment of the invention makes such tissue equivalent measurements because all of its components are made of a tissue equivalent low-Z plastic material. The activated charcoal between the two containers is mostly carbon which is also a tissue equivalent material.

The low-Z plastic material used for fabricating EICs must also be slightly electrically conductive or at least have a slightly conductive surface in order to bleed any static charge away (usually to ground) before it builds up to interfere with the normal operation of the EIC. This electrical conductivity is usually attained in the plastic by filing it with particulate or fibrous carbon. This carbon additive is preferred rather than metal additives because it is a low-Z material and, as such, retains the desirable tissue equivalent characteristics in the plastic. A low-Z metal such as aluminum or a carbon filled plastic such as polypropylene, polyethylene, polystyrene, or ABS are examples of suitable electrically conductive low-Z materials which can be used for making the components of this embodiment.

Thus, this embodiment is an EIC made of low-Z conductive plastic sealed within an outer container also made of low-Z plastic and with activated charcoal in the space between the outer container and the EIC. Since all of the materials in this embodiment, which the radiation must penetrate to reach the inner sensitive volume of the EIC, are tissue equivalent low-Z materials, it yields an accurate tissue equivalent gamma radiation dose measurement.

When electret ion chambers are used for measuring radon, natural background gamma radiation, which varies in intensity and energy from place to place, is an interferant. That is, because EICs are sensitive to gamma radiation, radon measurements made with EIC's must be corrected for the amount of natural background gamma radiation which is included in their radon signal. Since the invention is not exposed to radon, it can be used to measure and correct for this natural background gamma radiation. To accomplish this, the invention is exposed at the same location where the EIC radon measurement is made. The background gamma radiation as measured with the invention is deducted from the apparent radon measurement obtained with the radon measuring EIC to determine true radon concentration value (after both values are converted to equivalent units). Thus, the capability of the invention to measure natural background radiation is important in itself and in its value for correcting low concentration radon measurements made with similar EICS.

Figure 2:
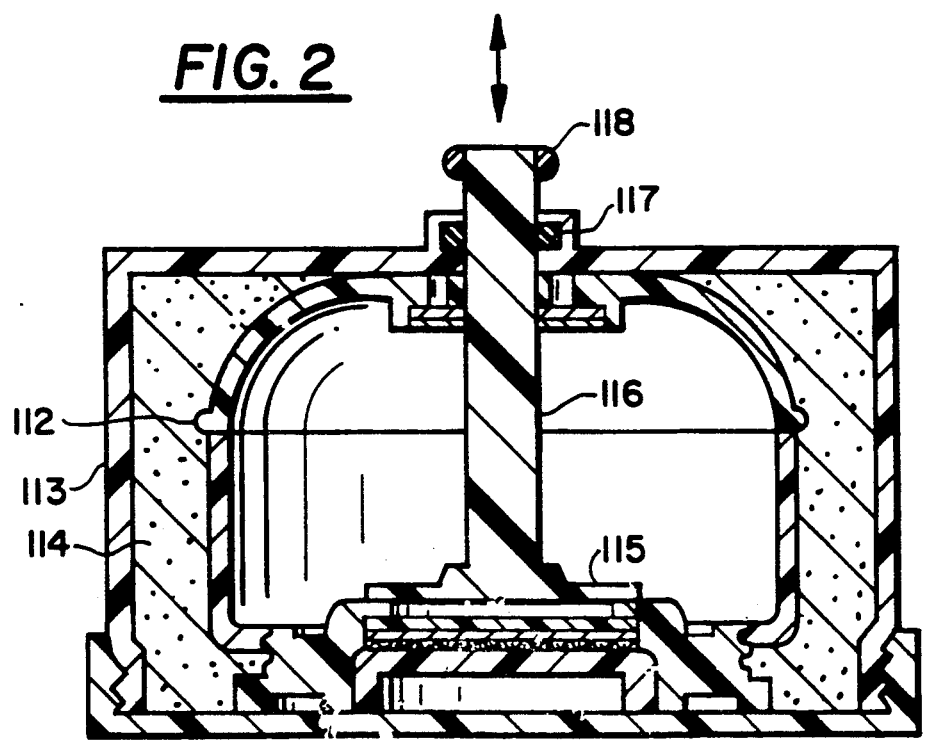
FIG. 2 is a cross-sectional view of a second embodiment of the present invention.

The embodiment of the invention, shown in FIG. 2, permits the EIC to be turned on and off at will without opening the outer container. This embodiment enables the user to easily control the duration of the gamma or x-ray measurement. Also, this embodiment can be stored or shipped for extended periods (weeks or months) in the off position and then turned on to initiate a gamma or x-ray measurement. In this second embodiment, provision is made to cover and uncover the electret sensor in the EIC at will from outside the sealed outer container after the charcoal has been introduced into the space between the EIC and the outer container and after the system is completely assembled. This is accomplished by providing a removable cover for the electret. This cover prevents ions from reaching the electret so the EIC is off when it is down close to the electret. However, this electret cover cannot touch the electret surface itself because it will cause the surface to lose some or all of its electric charge if it touches it directly. When the electret cover is down, the initial electret voltage, as measured before the EIC system is assembled, will remain unchanged for many months. This embodiment incorporates a mechanism which enables the electret cover to be raised up away from the electret at any time so as to initiate a measurement of penetrating radiation. The same electret cover mechanism can then be lowered to cover the electret again to terminate the measurement. This on-off capability permits the EIC embodiment shown in FIG. 2 to be shipped to distant location in the off position, turned on and off again at that location to effect a known exposure to penetrating radiation, and then returned to the point of origin where the final voltage of the electret can be read out in order to quantify the radiation dose received by the invention.

Several configurations are possible for the embodiment of FIG. 2 which enables remotely covering and uncovering of the electret in the EIC after the EIC has been sealed in its outer container and with the activated charcoal in place between the EIC and the outer container.

As seen in FIG. 2, the embodiment consists essentially of an EIC 112, an outer container 113 and a sorbent 114 between them. However this embodiment incorporates a disk shaped electret cover 115 slightly larger in diameter than the electret itself. This cover 115 can be lowered and raised to cover and uncover the electret at will by lowering and raising a vertical stem 116 having a knob 118 which is attached to the cover 115. The electret cover stem 116 penetrates up through the EIC wall 112, through the sorbent 114 and through the top of the outer container 113. An O-ring or similar sealing mechanism 117 is provided between the stem 116 and the outer container 113 to minimize leakage of radon into the sorbent 114. This arrangement of components permits the stem 116 and thus the electret cover 115 to be raised and lowered from outside the outer container 113. It is essential that this electret cover 115 and stem 116 also be fabricated from an electrically conductive material or one which has an electrically conductive surface so as to avoid buildup of electrostatic charge on these surfaces. Other material of construction can be the same as described above for the first embodiment shown in FIG. 1.

Figure 3:
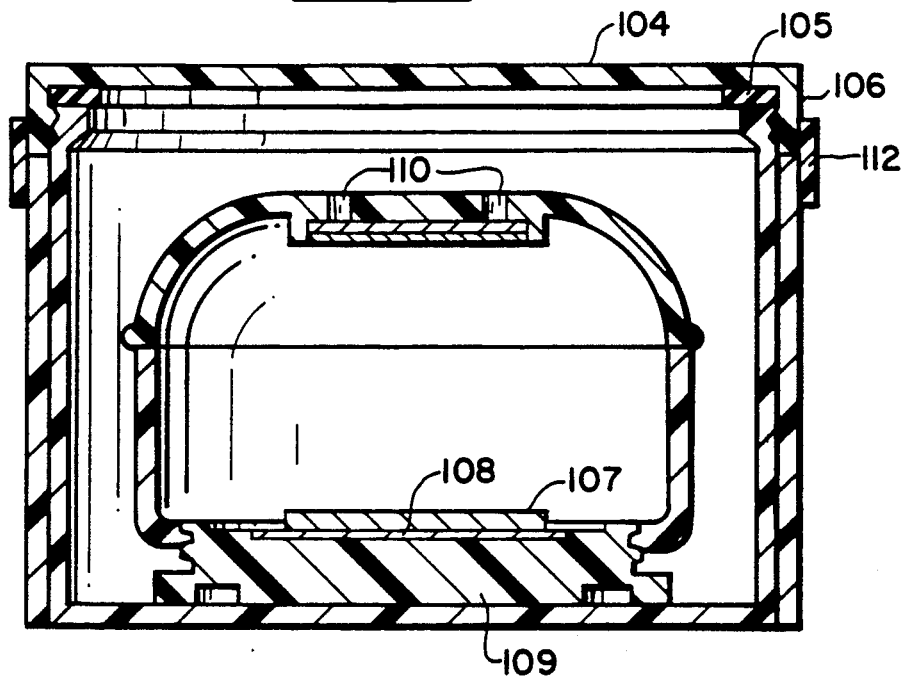
FIG. 3 is a sectional view of a third embodiment of the present invention.
Figure 4:
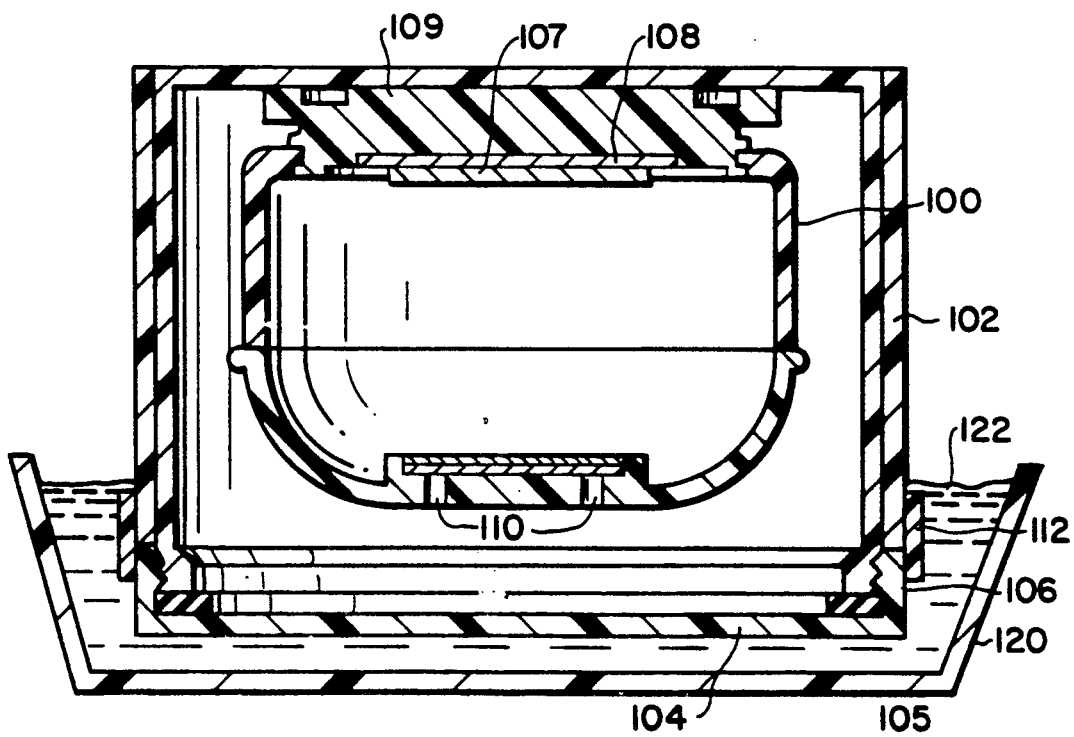
FIG. 4 is a sectional view of a fourth embodiment of the present invention, wherein the third embodiment is sealed in water.

It can be seen in FIG. 2 that EIC can be completely assembled with the electret cover fixed down over the electret. Since no ions can reach the electret with the electret cover down like this, the electret voltage will remain exactly the same until the cover is deliberately lifted to initiate a gamma radiation measurement. Raising the portion of the stem of the electret cover that is accessible on the outside of the outer container raises the electret cover inside the EIC thereby initiating ion collection by the electret, i.e., raising the cover turns the EIC on. Since all radon trapped inside during assembly and any radon which subsequently leaks into the outer container is gettered by the activated charcoal, the ions which the electret collects inside the EIC chamber are generated only by the gamma or x-radiation which penetrates through the EIC walls from outside i.e., there are no radon generated ions to add to the ions generated by the penetrating radiation. When the predetermined exposure time for radiation measurement is up, the lid can be pushed back down close to the electret surface to turn the EIC off, thus terminating the penetrating radiation measurement Another embodiment of the invention is shown in FIG. 3 which does not require an adsorbent to remove the undesirable ambient radon which is captured inside the outer container during assembly. As shown in FIG. 3, this embodiment consists of an electret ion chamber completely sealed within a radon proof outer container. The outer container is sealed by both an inner compression seal 105 and an external seal of tape 112 or other suitable sealant. This outer seal can be a liquid seal as shown in FIG. 4, where the covered container 102 is immersed in a pan 120 which is filled with a liquid 122 such as water. The level of the liquid is such that it covers the joint between the cover 104 and the container 102. In this embodiment, the undesirable radon captured inside the outer container is eliminated by its own natural radioactive decay. Since its radioactive half-life is only 3.84 days, the captured radon only contributes its undesirable background signal for about one week before it has essentially decayed away. The amount of this undesirable radon signal can be minimized by assembling both the ion chamber and the outer container in an environment where the radon concentration is very low. In practice, the total period of exposure of the embodiment of FIG. 3 to the gamma radiation being measured is always made sufficiently long to render the relatively small radon background signal an insignificant portion of the overall gamma radiation signal. This is effectively accomplished by exposing the dosimeter for time periods which are long compared to the half-life of radon-222. It is obvious that the undesirable radon inside the outer chamber can also be purged by various means prior to sealing the containers. Such methods including flushing with radon depleted air, nitrogen, carbon dioxide, etc.

Figure 5:
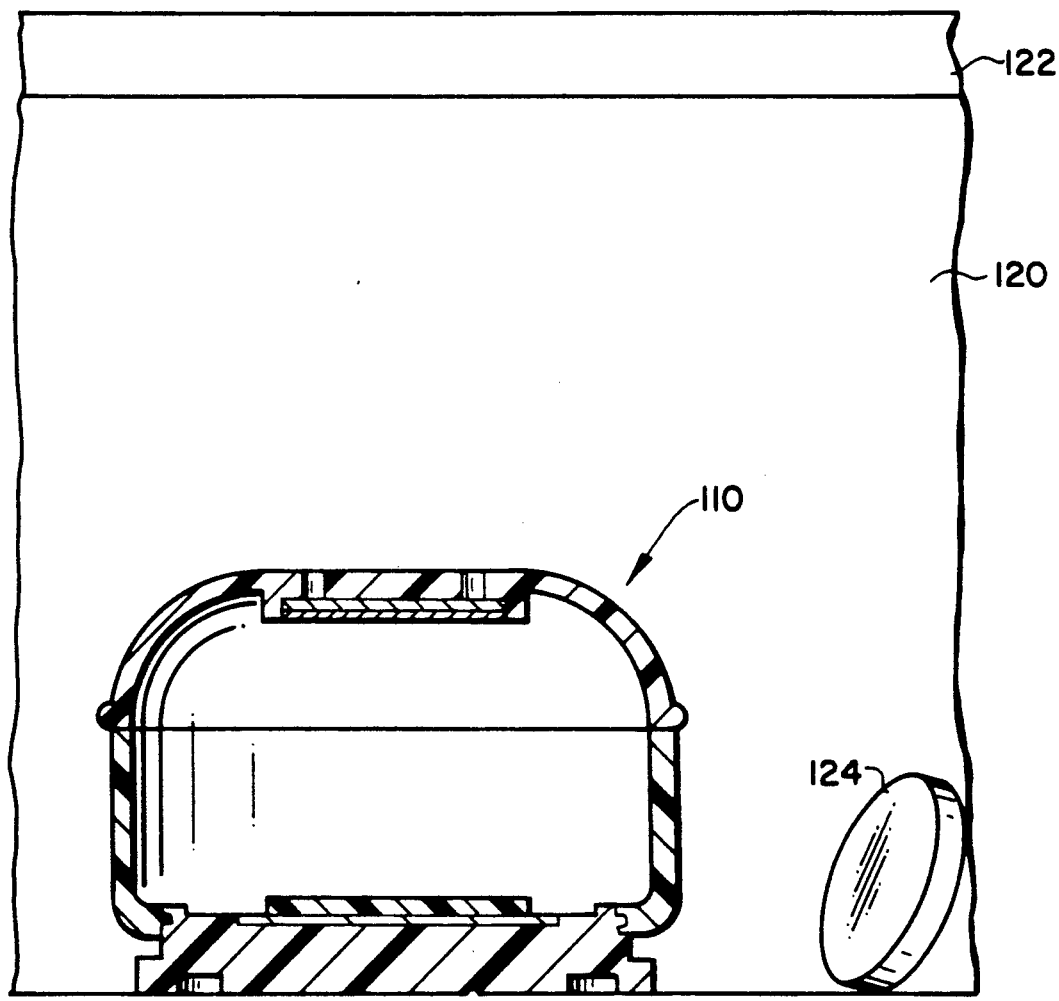
FIG. 5 is a sectional view of a first embodiment of the present invention wherein the ion chamber is enclosed in a radioactive gas-tight bag with a sorbent material.

FIG. 5 shows a preferred embodiment of the invention. This embodiment differs from the one depicted in FIG. 1 by employing a radioactive-gas-tight flexible-wall container. An EIC 110 is contained inside a flexible-wall container 120, such as a plastic bag 120, that has been heat sealed along a seam 122, using any well known sealing technique. A container of activated charcoal 124 is placed in the bag 120 along with an electret ion chamber 100 to getter radon which has been sealed in or penetrates the bag. The combined actions of the radioactive-gas-tight bag and the charcoal reduce measurement errors resulting from radon, thus improving the low level gamma/X-ray measurement. The bag 120 repels radon which may be in the environment and allows manipulation of the EIC and the charcoal canister 124. If transparent, the bag allows visual inspection and facilitates manipulation of the EIC 110 and charcoal canister 124.

The radioactive-gas-tight bag may be made of a polyester film (e.g., "MYLAR") which has been coated with polyethylene. Such a bag may be sealed along the edges using well known manufacturing and heat sealing techniques. Alternatively, the bag may be made of a metal foil, such as aluminum, sandwiched between polyethylene layers. Aluminum foil, "MYLAR" and polyethylene materials have the low "Z" properties described earlier; therefore, the system simulates tissue gamma ray absorption.

Charcoal may be packaged within the bag by any means which exposes the charcoal to the bag interior. The canister may a cylinder open at one end. Charcoal may be held in the cylinder by a mesh secured across the open end. Alternatively, the container may be a porous paper envelope.

The charcoal may be processed before sealing by storing it in a radon-tight container for a period of time in excess of several radon path-lives. Such "aging" allows radon captured by the charcoal to decay, thus reducing the probability that radon captured on the charcoal before enclosure in the bag would be released after sealing.

In another embodiment, an electret ion chamber is enclosed in a radioactive gas-tight bag without charcoal. Storing such a sealed ion chamber allows radon sealed within the bag to decay. The sealed radon then ceases to be a source of interference with gamma/X-ray measurements. This embodiment may be appropriate when the ion chamber is left for long exposure periods, such as three months. With such long exposures, ions formed from decay of radon sealed in the bag cause only acceptably small measurement error.

It is contemplated that any EIC may be enclosed within a flexible-wall container, including embodiments shown herein, in related applications, or in commonly assigned U.S. application Ser. No. 07/409,695 filed Sept. 20, 1989 and incorporated herein by reference.

Figure 6:
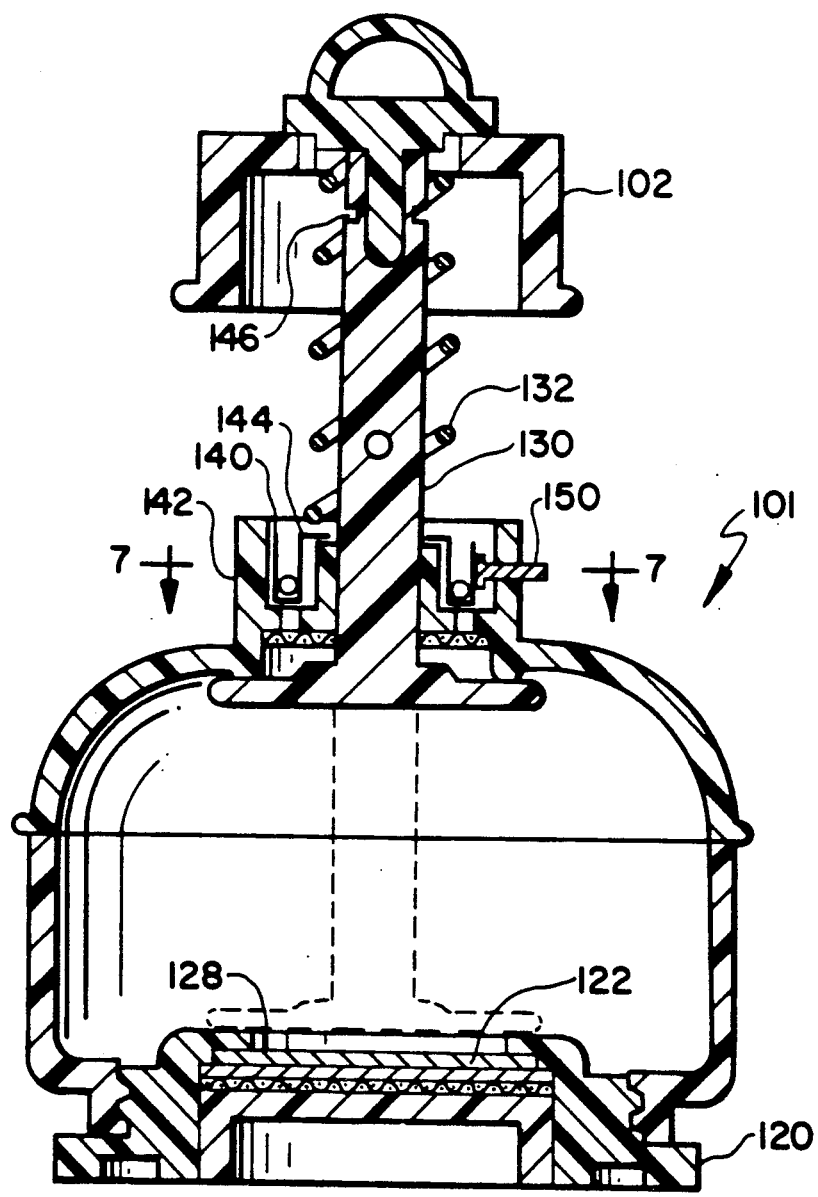
FIG. 6 is sectional view of a second embodiment of an EIC for use within a flexible radioactive gas-tight bag.

FIG. 6 is a side-sectional view of an EIC 101 suitable for containment within a flexible container. The EIC includes a plunger 130 which acts as a cover (keeper) to minimize air volume 128 adjacent an electret 122 so that the electret is essentially "off" as a radon monitor when the plunger is in its lowered position (shown in broken lines). A spring 132 biases the plunger 130 to a raised position, and an exposed portion 102 provides a convenient grasping location.

Means are provided to easily operate such an EIC while it is contained within a flexible container. A cup 140 rests within a neck portion 142 of the EIC 101. The spring 132 exerts a force on the cup 140 along the axis of motion of the plunger 130 and positions the cup 140 generally within the EIC neck portion 142. The cup 140 includes a flange portion 144 adapted to engage an annular notch 146 in the plunger 132 and lock the plunger in the lowered ("off") position.

Figure 7:
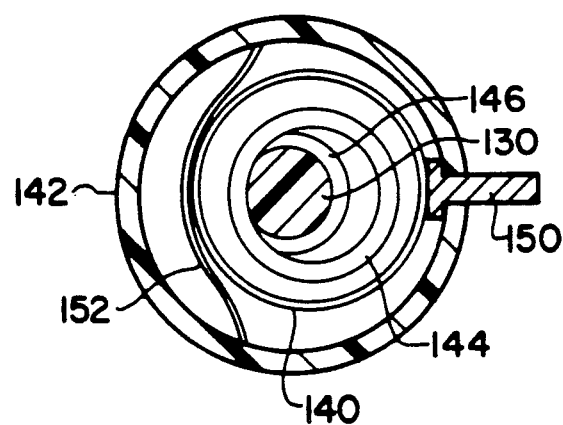
FIG. 7 is a sectional view of the neck portion of the EIC of FIG. 6 in a closed position.
Figure 8:
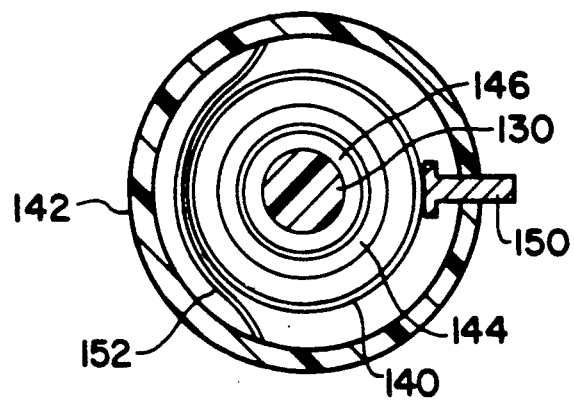
FIG. 8 is a sectional view of the neck portion of the EIC of FIG. 6 in an open position.

Operation of the EIC is best appreciated with reference to FIGS. 7 and 8 which are top-sectional views of the neck portion 142 of the EIC of FIG. 6.

FIG. 7 shows the cup 140 in a position which is out of concentric alignment with the plunger 130. When the plunger is in a lowered position such that the annular notch 146 aligns with the cup flange portion 144, the biasing spring 152 positions the cup flange portion 144 to engage the annular notch 146. The EIC plunger 130 is thus secured in a lowered position and the EIC is effectively "off."

FIG. 8 shows the cup 140 in a position which is in concentric alignment with the plunger 130. A button 150 extends from the interior to the exterior of the neck portion 142. By moving the button 150 toward the interior of the neck portion 144, the button 150 opposes the biasing spring 152 and the cup 140 moves to a position concentric with plunger 130. In such a position, the cup flange portion 144 no longer engages the plunger annular notch 146, and the spring 132 (shown in FIG. 6) biases the plunger to the raised position. In such a position, the EIC is effectively "on".

When the EIC 101 is enclosed within a flexible-walled it can be turned "on" by simply depressing the button 150. It can be turned "off" by merely pressing the plunger to the lowered position.

What has been described is a small rugged economical low level gamma/X-ray dosimeter which excludes background radiation signals. The invention is not to be limited to what has been disclosed but to the spirit and scope of the appended claims.

WHAT IS CLAIMED:

1. An apparatus for monitoring gamma or X-ray radiation comprising a chamber having an inner surface which is electrically conductive, an electret positioned within the chamber for holding an electrostatic charge which collects ions formed in the chamber by bombardment of gamma or X-ray radiation, said chamber enclosed in a radioactive-gas-tight bag.

2. The apparatus of claim 1 wherein the bag is made of polyester film coated with polyethylene.

3. The apparatus of claim 1 wherein the bag is made of metal foil coated with polyethylene 4. The apparatus of claim 1, further comprising a radon sorbent material within the radioactive-gas-tight bag.

5. The apparatus of claim 4 wherein the sorbent material is activated charcoal.

6. A tissue equivalent dosimeter for measuring low level gamma of X-ray radiation, comprising an electret ion chamber formed of low "Z" material, an electret charged to a known voltage level, the chamber enclosed by a radioactive-gas-tight bag formed of a low "Z" material.

7. The apparatus of claim 6 wherein the bag is made of polyester film coated with polyethylene.

8. The apparatus of claim 6, wherein the bag is made of metal foil coated with polyethylene.

9. The apparatus of claim 6, further comprising a sorbent material enclosed in the radioactive-gas-tight bag.

10. The apparatus of claim 6, wherein the sorbent material is activated charcoal.

* * * * *